UNITED STATES PATENT OFFICE.

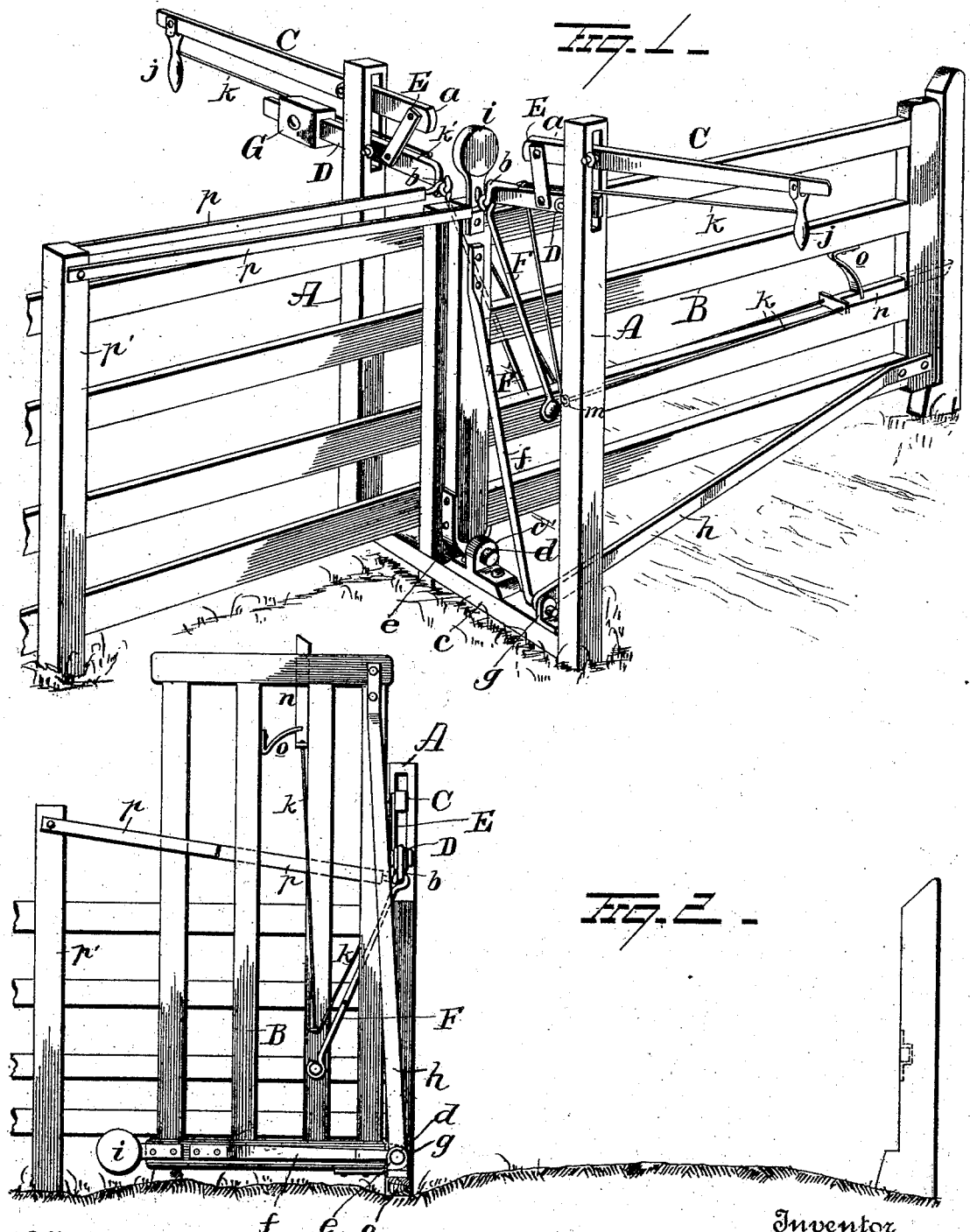

THOMAS HENRY LINDLEY, OF SAVANNAH, IOWA.

GATE AND MECHANISM THEREFOR.

SPECIFICATION forming part of Letters Patent No. 505,274, dated September 19, 1893.

Application filed December 3, 1892. Serial No. 453,962. (No model.)

*To all whom it may concern:*

Be it known that I, THOMAS HENRY LINDLEY, a resident of Savannah, in the county of Davis, and State of Iowa, have invented certain new and useful Improvements in Gates and Mechanism for Operating the Same; and I do hereby declare the following to be a full, clear, and exact description of the invention, such as will enable others skilled in the art to which it appertains to make and use the same.

My invention relates to an improvement in gates and means for opening and closing the same,—the object of the invention being to produce simple and efficient means whereby the gate can be readily opened or closed with but slight exertion on the part of the operator.

With this object in view the invention consists in certain novel features of construction and combinations and arrangements of parts as hereinafter set forth and pointed out in the claim.

In the accompanying drawings: Figure 1 is a view showing the gate closed. Fig. 2 is a view illustrating the gate open.

A, A, represent the gate posts and B the gate.

Pivotally connected to the tops of the posts A, A, are long levers C, C,—the pivotal connection of said levers with the posts being near the inner ends of said levers, so that the short arms $a$ of said levers will project toward the gate B.

Pivotally connected to the posts A, A, below the pivotal connection of the levers C, C, thereto, are shorter levers D, D. The ends of the short arms $a$ of the long levers C have the upper ends of links E, pivotally connected thereto,—the lower ends of said links being pivotally connected to the shorter levers D, at a point preferably a few inches from the pivotal connection of said shorter levers with the posts A. At the inner ends of the shorter levers D, hooks $b$ are secured, and to these hooks rods F are loosely connected,—said rods extending downwardly and forwardly, and connected at their lower ends with a bolt passing through one of the lower rails of the gate B. One of the arms D is preferably made longer than the other and provided at its free end farthest removed from the post A to which it is pivoted, with a weight G.

Below the base of the gate B is a cross bar $c$ on which a perforated bracket $c'$ is located. The gate B is provided at its rear lower corner with a bracket $e$ having a pintle $d$ adapted to enter the perforation of the bracket $c'$, thus constituting a hinge. A rod or bar $f$ is secured to the rear end of the gate B near the top of the latter and projects downwardly and laterally therefrom and at its lower end is connected with the cross bar $c$ by means of a hinge $g$. A rod or bar $h$ is secured at one end to the lower end of the rod or bar $f$ and at its other end to the forward end of the gate in proximity to the lower end thereof.

From the construction and arrangement of parts above set forth, it will be seen that as the fulcrum of each long lever C is near the inner end thereof; that as the short arm of said lever is connected with a short lever near the pivoted end of the latter and that as the short lever is in turn connected with the gate by the rods F, it will be necessary to move the free end of the long lever through but a short arc of a circle to raise or lower the gate on its hinges, and hence a very small amount of power will be required to operate the gate. It will also be seen that the operation of the gate will be rendered easier by the weight G at the end of one of the shorter levers D, said weight acting, in effect, as a balance for the gate. The operation of the gate will also be rendered easier by the employment of a weight $i$ placed on top the gate at the inner end thereof.

At the free end of each long lever C, a depending arm $j$ is attached and has connected to it, one end of a cord or wire $k$. From the arm $j$ the cord or wire is passed rearwardly and over a pulley or eye $k'$ in the end of the lever D, from which it passes downwardly and through eyes $m$ on one of the lower rails of the gate. From the loop or eye $m$, the cord or wire $k$ is passed forwardly and its end attached to a latch $n$. The latch $n$ has a spring plate $o$ attached to it, which latter is secured at its other end to the gate. Thus it will be seen that when the gate is opened by manipulating one of the levers C, the pulling of the cord or wire $k$ will operate to withdraw the latch bar $n$ and thus release the gate. Rods or bars $p$ are pivotally connected at their rear ends to a port $p'$ located rearwardly from the gate, the forward ends of the rods or bars being loosely connected to the inner ends of the levers D. Between the rods or bars $p$ the gate is adapted to enter when it is open.

My improvements are very simple in construction, easy to operate and effectual in the performance of their functions.

Slight changes might be made in the details of construction of my invention without departing from the spirit thereof or limiting its scope, and hence I do not wish to restrict myself to the precise details of construction herein set forth, but, Having fully described my invention, what I claim as new, and desire to secure by Letters Patent, is—

In a tilting gate, the combination with a gate proper, and post at the free end and the sides of the gate, of levers pivoted to the side posts, rods connecting the free ends of these levers to the gate, hand levers pivoted to the side posts and connected to the levers operating the gate, rods extending from a post in the rear of the gate to the free ends of the levers, handles pivoted at the end of the hand levers, a latch and flexible devices extending from the latch to the main levers and thence to the handles whereby the latch may be operated by the handles, substantially as set forth.

In testimony whereof I have signed this specification in the presence of two subscribing witnesses.

THOMAS HENRY LINDLEY.

Witnesses:
LOUIS A. YORK,
HORACE G. ONEAL.